Feb. 1, 1966  J. E. TOPPARI ETAL  3,233,028
METHOD OF MAKING A CAPACITOR
Filed April 27, 1960
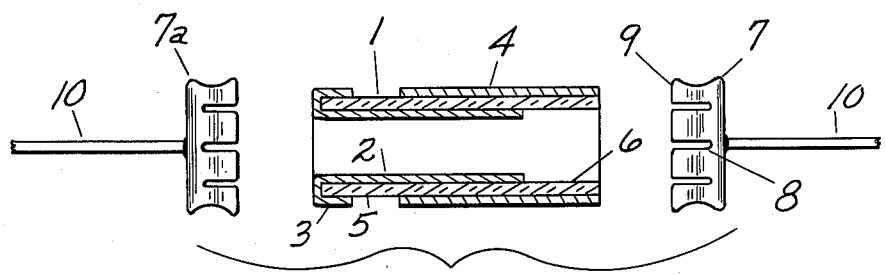
FIG. 1
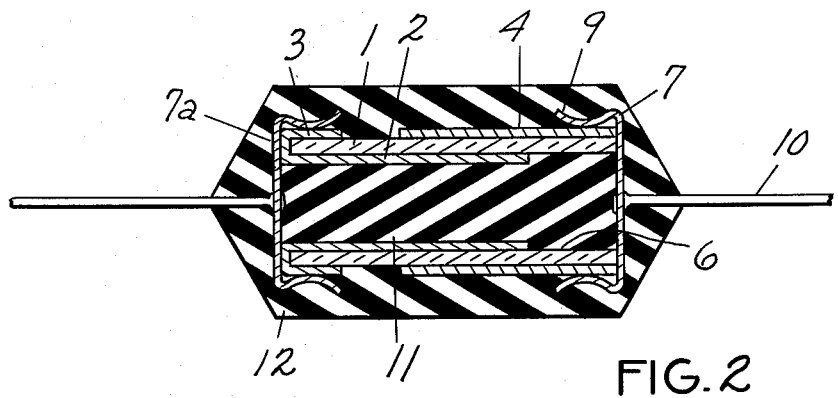
FIG. 2
FIG. 3
FILL BORE OF CAPACITOR
WITH THIXOTROPIC SILICONE
DIELECTRIC FLUID WITH
GELLING CATALYST
↓
GEL IN SITU
↓
MOLD PLASTIC CASE
AROUND CAPACITOR
John E. Toppari
Richard Stammer
INVENTORS
BY Ralph Hammar
Attorney 3,233,028
METHOD OF MAKING A CAPACITOR
John E. Toppari and Richard Stammer, Erie, Pa., assignors to Erie Technological Products, Inc., a corporation of Pennsylvania
Filed Apr. 27, 1960, Ser. No. 24,973
2 Claims. (Cl. 264—272)

This invention is a tubular capacitor for high temperature operation and method of making the same in which the bore of the tubular dielectric is filled with a thixotropic gelable silicone dielectric liquid which is gelled in place. The capacitor has an operating range from −55° C. to +150° C. and higher.

In the drawing, FIG. 1 is an exploded view partly in section of a tubular capacitor, FIG. 2 is a longitudinal section and FIG. 3 is a block diagram of the method.

The conventional parts of the capacitor are readily identified, 1 being the tubular dielectric, 2 the inner electrode which has an extension 3 on the outer surface of one end of the dielectric and 4 being the outer electrode. There is an outer insulating band 5 and an inner insulating band 6. Electrical connection is made to the electrodes by metal caps 7, 7a pressed onto opposite ends of the dielectric. The caps have the usual slits 8 dividing the caps into a plurality of spring fingers 9 which conform to the dielectric when the caps are pressed in place. The cap 7 is pressed directly over the outer electrode 4. The cap 7a is pressed over the extension 3 of the inner electrode 2. Both of the caps have wire leads 10. The construction so far described is or may be of common construction and may differ substantially in appearance from the construction illustrated.

To prevent breakdown under moisture and temperature conditions, the bore of the dielectric is filled with a thixotropic silicone dielectric 11 having dispersed therein a gelling catalyst. It is particularly important that there be a complete fill at the insulating band 6 which is the location at which breakdown is most likely to occur. To insure this, the capacitors are usually supported with the cap 7 lowermost and the silicone fluid is injected into the bore through a nozzle which is inserted to the bottom and is raised as the fill progresses. The fill stops at the top of the bore. There may be some crowning. After the fill, because of the thixotropic properties, the silicone fluid remains in place and does not flow. The cap 7a may then be installed and the capacitor baked in an oven for sufficient time to cause the gelling reaction. The capacitor is then provided with a molded external case 12.

Silicone dielectric fluids with gelling catalysts are available on the market in a variety of compositions. The fluids as received from the manufacturer are not suitable for filling the bore of the tubular capacitors. The fluid runs out before the gelling reaction is completed and results in an incomplete fill. In order to make the silicone gel fluid suitable, it is mixed with a finely divided dielectric material causing it to become thixotropic so it remains in place and does not flow prior to or during the gelling reaction. These materials and the proportions needed are well known. Finely divided silica and bentonitic clays are common materials having the desired physical properties and also having the desired electrical properties. Metallic stearates will impart thixotropic properties to the silicone gel fluid and have good electrical properties but the melting points are not high enough.

Silicone greases are not suitable for filling the bore of the dielectric. While these greases are thixotropic and remain in place after the filling operation, they bleed under high temperature operation. After completion of the gelling reaction, the silicone gel does not bleed and is immobile at all operating temperatures.

There are many plastics available for the case 12. Diallyl phthalate plastics, fluorinated plastics, silicones, epoxies, and alkyds are examples. The selection of the plastic for the case is largely dictated by economics and operating temperature requirements. The molded plastic case completely encloses the condenser and provides good protection for the outer insulating band 5.

What is claimed as new is:

1. The method of making a capacitor having a tubular dielectric with inner and outer electrodes respectively connected to leads at opposite ends of the dielectric, the inner electrode terminating short of one end of the dielectric to provide an insulating band, which comprises filling the bore of the dielectric with a silicone dielectric fluid in contact with said insulating band, said fluid having dispersed therein a gelling catalyst and finely divided dielectric particles selected from the class consisting of silica and bentonitic clays causing the fluid to be thixotropic so it remains in place and does not run prior to or during the gelling reaction, and gelling the fluid in situ so it does not bleed and is immobile at all operating temperatures, and then molding a plastic insulating case molded around and completely enclosing the capacitor.

2. The method of making a capacitor having a tubular dielectric with inner and outer electrodes respectively connected to leads at opposite ends of the dielectric, the inner electrode terminating short of one end of the dielectric to provide an insulating band which comprises filling the bore of the dielectric with a silicone dielectric fluid in contact with said insulating band, said fluid having dispersed therein a gelling catalyst and finely divided dielectric particles causing the fluid to be thixotropic so it remains in place and does not run prior to or during the gelling reaction, and gelling the fluid in situ so it does not bleed and is immobile at all operating temperatures, and then molding a plastic insulating case molded around and completely enclosing the capacitor.

References Cited by the Examiner
UNITED STATES PATENTS

| | | | |
|---|---|---|---|
| 1,843,622 | 2/1932 | Norton | 18—59 |
| 2,258,222 | 10/1941 | Rochow | 317—258 |
| 2,525,668 | 10/1950 | Gray | 317—242 X |
| 2,526,688 | 10/1950 | Robinson | 317—258 |
| 2,531,440 | 11/1950 | Jordan | 252—63.5 X |
| 2,544,342 | 3/1951 | Miller | 317—258 |
| 2,915,808 | 12/1959 | Clemons | 29—25.42 |
| 2,940,025 | 6/1960 | Markarian | 317—258 |
| 2,948,838 | 8/1960 | Obenhaus | 317—258 X |
| 2,957,114 | 10/1960 | Lamphier | 317—258 X |

JOHN F. BURNS, Primary Examiner.
SAMUEL BERNSTEIN, E. JAMES SAX, Examiners.